T. HOPPER.
Straw Cutter.
No. 1,103.
Patented March 15, 1839.
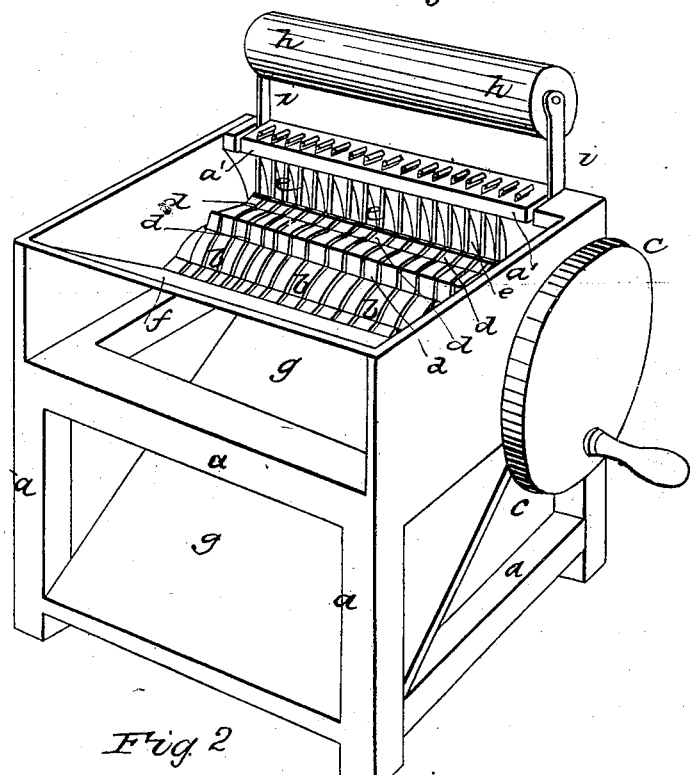
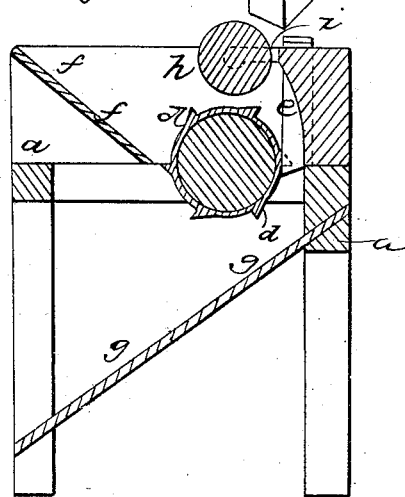

UNITED STATES PATENT OFFICE.

THOMAS HOPPER, OF NEW BRUNSWICK, NEW JERSEY.

MACHINE FOR CUTTING STRAW AND OTHER VEGETABLE SUBSTANCES.

Specification of Letters Patent No. 1,103, dated March 15, 1839.

*To all whom it may concern:*

Be it known that I, THOMAS HOPPER, of the city of New Brunswick, in the county of Somerset and State of New Jersey, have invented a new and useful Machine for Cutting Straw and which may be applied to the cutting of other vegetable substances, and I do hereby declare that the following is a full and exact description thereof.

In the accompanying drawings the machine is shown in perspective in Figure 1; and Fig. 2 is a vertical section through the same, from front to back, like parts in each figure being designated by the same letters of reference.

$a$, $a$ is the frame of the machine, which may be made of wood, as represented in the drawings, or, the whole may be made of cast iron. A revolving cylinder $b$, $b$, extends from side to side of the frame, and this may be turned by means of a winch, or by a band on the whirl $c$, $c$, attached to the axis thereof, or in any other convenient way.

That which I have denominated a cylinder is not truly such, as it has upon its projections $d$, $d$, extending from end to end, for the purpose of carrying the straw, or other article to be cut, against the knives, or cutters $e$, $e$. These knives are made of steel, and are placed in a row, at a distance apart equal to that intended to be given to the cut straw, they are held in slots in the rail $a'$, $a'$, and by suitable grooves embracing them at the back; their cutting edges pass into grooves made in the cylinder to receive them, and shown distinctly in the perspective drawing.

The cylinder may be formed of wood and armed with iron, or it may be formed wholly of iron, in wheel-like sections, confined together on an axis passing through them, or in other ways.

$f$, $f$, is a sloping board constituting, with the cylinder $b$, $b$, a hopper, along which the straw is to be laid, that it may be carried by the projections, or teeth $d$, $d$, against the knives; the cut straw falls upon the lower sloping board $g$, $g$, by which it is conducted off.

To keep the straw in contact with the cylinder, a pressing roller $h$, $h$, working upon arms $i$, $i$, is brought down upon it, and may be raised at pleasure.

What I claim as my invention, and desire to secure by Letters Patent is—

The manner above described, of cutting straw, and other vegetable matter, by forcing the same against a row, or series of knives, or cutters by means of a cylinder having projections thereon, which by the aid of grooves, pass between the knives, or cutters, forcing the material to be cut against them, substantially in the manner set forth.

THOMAS HOPPER.

Witnesses:
CLARKSON RUNYON,
SAMUEL M. VAIL.